United States Patent [19]
Larson et al.

[11] 3,834,568
[45] Sept. 10, 1974

[54] PORTABLE BIN CARRIER ASSEMBLY

[75] Inventors: Clarence E. Larson; Richard H. Dawley, both of Columbus; Roger Reese, Lancaster, all of Ohio

[73] Assignee: Martin Marietta Corporation, New York, N.Y.

[22] Filed: July 10, 1972

[21] Appl. No.: 270,167

Related U.S. Application Data

[63] Continuation of Ser. No. 59,455, July 30, 1970, abandoned.

[52] U.S. Cl. ............... 214/307, 214/77 R, 214/515, 214/390
[51] Int. Cl. .......................................... B65g 65/04
[58] Field of Search .......... 214/300, 307, 390, 515, 214/77 R

[56] References Cited
UNITED STATES PATENTS

| | | | |
|---|---|---|---|
| 2,517,304 | 8/1950 | Greening | 214/515 |
| 2,678,737 | 5/1954 | Mangrum | 214/515 |
| 2,832,630 | 4/1958 | Sterling | 214/300 |

Primary Examiner—Robert G. Sheridan
Assistant Examiner—Lawrence J. Oresky
Attorney, Agent, or Firm—John A. Crowley, Jr.

[57] ABSTRACT

A portable bin carrier has pivotally mounted lifting arms that engage lifting lugs on the bin to be carried. The bin is raised for transport by raising the lifting arms. Support members are provided to support the lifting arms as the bin-supporting carrier is moved from one location to another. The lifting arms disengage from the bin lifting lugs upon being lowered while the bin is independently supported at its desired elevation following movement to its desired location. Telescoping legs are provided on the bin so that said bin may be independently supported at desired upper and lower elevations. Hydraulic means are provided for raising and lowering said lifting arms between upper and lower positions, including an intermediate position for support of the bin during transport and prior to elevation of the material-bearing bin to its desired higher elevation at a job site.

5 Claims, 3 Drawing Figures

PATENTED SEP 10 1974　　　　　　　　　3,834,568
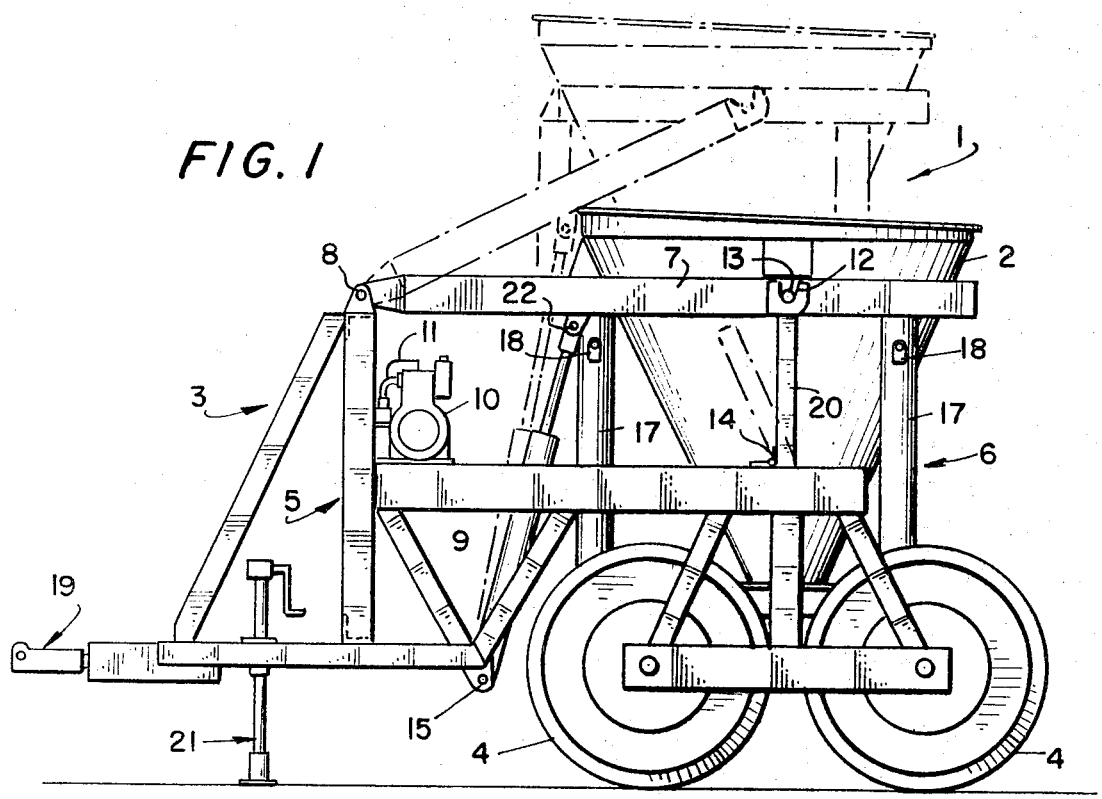
FIG. 1
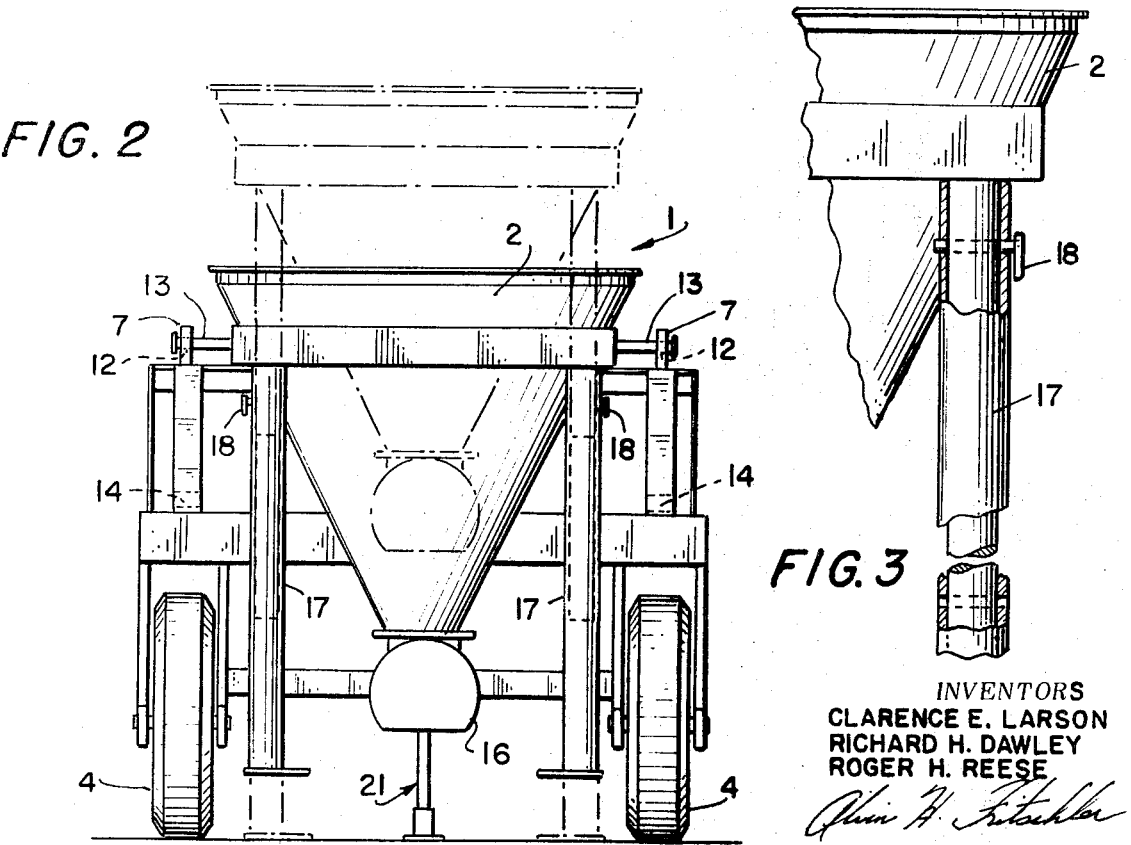
FIG. 2
FIG. 3
INVENTORS
CLARENCE E. LARSON
RICHARD H. DAWLEY
ROGER H. REESE
ATTORNEY

PORTABLE BIN CARRIER ASSEMBLY

CROSS REFERENCE TO RELATED APPLICATIONS

This application is a continuation of application Ser. No. 59,455, now abandoned.

BACKGROUND OF THE INVENTION

1. Field of the Invention

The invention relates to an improved means for transporting a storage bin from one location to another. More particularly, it relates to a portable bin carrier assembly suitable for transporting storage bins between loading and discharging locations.

2. Description of the Prior Art

In the use of bulk products, such as masonry cement, Portland cement, sand, pre-mix material, and the like, it is frequently desirable to load a storage bin at a central storage and loading area for transport to one or more convenient job site locations. As the product will generally be charged to the bin from the top, it is usually desirable that the bin be positioned at a relatively low elevation, near the ground, for charging of product at the loading location. At the discharge location on the job site, on the other hand, it is generally desirable that the storage bin be positioned at a higher elevation for discharge through a gate at the bottom of the bin onto weighing equipment, batching devices or the like. While storage bins can thus be loaded at a central loading area, transported to the desired job site, and set up at the desired elevation for discharge of product as needed, this activity represents an element of time and expense that must be incorporated in the overall cost of the operations involving such bulk products. It is desirable, therefore, that the time and expense of the bin-moving operation be minimized as much as possible. For this reason, a device for conveniently moving such storage bins and for facilitating the setting up of the bins at their desired elevations at the loading area and the job-site discharge area would be highly advantageous in the art.

It is an object of the invention, therefore, to provide an improved portable bin carrier assembly.

It is another object to provide a bin carrier assembly for conveniently moving storage bins between and setting said bins up at loading and discharge locations.

It is a further object of the invention to provide a portable bin carrier assembly for facilitating the transport of bulk products in storage containers.

With these and other objects in mind, the present invention is hereinafter set forth in detail, the novel features thereof being particularly pointed out in the appended claims.

SUMMARY OF THE INVENTION

The objects of the inveniton are accomplished by a novel carrier-bin assembly that permits the bin to be convenienetly lifted off the ground at one location, transported "over the road" and set up at a second location, with the desired elevations of the bin at each location being readily adjusted with minimum time of adjustment and maximum convenience. A carrier assembly having an open end is back so to enclose the bin to be moved within the carrier frame. Lifting arms on both sides of the frame are raised so as to engage lifting lugs on both sides of the bin and to lift the bin for transport from one location to another. Support members are conveniently positioned to support the lifting arms holding the storage bin during transport of the bin from one location to another. Telescoping legs are provided on the storage bin so that the bin may be supported at desired elevations at each location. The lifting arms can raise the bin at the job site to a higher elevation than that at which the bin is carried during transport from one location to another. Hydraulic means, such as an engine-driven hydraulic pump can be used to supply the power required for movement of the lifting arms that are pivotally connected to the carrier frame. The frame can conveniently be connected to a truck or other vehicle for movement between the loading and discharge areas.

BRIEF DESCRIPTION OF THE DRAWINGS

The present invention is hereinafter described in detail with respect to the accompanying drawings in which:

FIG. 1 is a side elevational view showing the carrier assembly of the present invention supporting a bin in its over-the-road position with the telescoping support legs in their closed position lifted off the ground and indicating the upper position of said assembly in which the bin is raised to an elevated position with its telescoping legs in an extended position to support the bin independently at said upper position;

FIG. 2 is an end view of the carrier assembly of FIG. 1 as viewed from the open end of the assembly frame; and FIG. 3 shows the adjustable leg of the apparatus.

DETAILED DESCRIPTION OF THE INVENTION

Referring to the drawings, the bin carrier assembly is generally referred to by the numeral 1. Bin carrier assembly 1 is employed to support bin 2 for movement from one location to another and to facilitate setting up bin 2 at its desired elevation at each location as herein described. Bin carrier assembly 1 has an open end U-shaped carrier frame 3 having wheels 4 mounted thereon so as to facilitate movement of assembly 1 from one location to another.

Carrier frame 3 has a closed front end 5 and an open back end 6. On each side of U-shaped carrier frame 3, lifting arms 7 are pivotally mounted on carrier frame 3 as by suitable mounting pins 8. In order to raise and lower lifting arms 7 and thereby to control the positioning of line 2, single acting, hydraulically operated piston and cylinder devices 9 are pivotally mounted at 15 and are pivotally connected to lifting arms 7 at point 22 and are operated by means of hydraulic pump 10 powered by gasoline motor 11, having its own storage tank mounted on carrier frame 3. Lifting arms 7 are shown in FIG. 1 with notches 12 formed on the upper side thereof in proper position to engage projecting lifting lugs 13 correspondingly positioned on opposite sides of bin 2 upon being raised from a position beneath said lifting lugs 13. Bin 2 is thus pivotally supported so that it may remain in a generally upright position with its top portion horizontal as the bin is raised or lowered.

Bin 2 has a commercially available material discharge gate 16 positioned at its lower end to control the discharge of material therefrom. In order to independently support bin 2 in an upright position support legs are conveniently attached to the bin, with three of said legs being particularly suitable for this purpose. In the illustrated embodiments, support legs 17 are shown as telescoping legs capable of independently supporting bin 2 at various elevations, most particularly at a desired lower elevation when said legs are in their closed position, and at a desired higher elevation when said telescoping legs are in their extended position. Locking pin means 18 are provided for retaining said telescoping legs 17 in their extended position. Each bin 2 is of such size relative to U-shaped carrier frame 3 that at least the lower portion of bin 2 and telescoping legs 17 extending from said bin may be enclosed within the sides of carrier frame 3 as shown particularly in FIG. 2 so that, upon being raised, pivotally mounted lifting arms 7 may engage lifting lugs 13 on either side of bin 2.

At the closed end 5 of U-shaped carrier frame 3, suitable coupling means 5, such as a conventional trailer hitch, is provided for coupling bin carrier assembly 1 to a truck or other vehicle, not shown, supplying the locomotion for transporting the assembly from one location to another. During over-the-road hauling of the assembly from one such location to another, particularly when carrying a material laden bin, it is desirable to relieve the burden on hydraulic cylinders 9 that support the bin and to cushion the load against road shocks that may impose an undue strain on cylinders 9. Accordingly, arm support members 20 are secured to opposite sides of carrier frame 3 and are adapted to support lifting arms 7 at an elevation sufficiently above the lower elevation at which lifting arms 7 engage lifting lugs 13 or 15 so that the bin is retained at an elevation permitting sufficient road clearance for support legs 17. In order to readily serve such load-supporting purpose without interfering with the convenient lowering of lifting arms 7 to a position from which it can be raised to again engage the lifting lugs of a bin, arm support members 20 are hinge mounted at 14 or similarly mounted on carrier frame 3 so that they can be folded aside when not employed for supporting lifting arms 7. In order to avoid tilting of carrier assembly 1 as by front end 5, especially coupling means 19, tipping downward to the ground, jack means 21 may be provided at the closed front end of carrier frame 3 to retain the assembly at a proper orientation with coupling means 19 at a desired elevation for convenient connection with the truck or other source of locomotion employed.

It is generally desirable to include a brake means for controlling the movement of carrier assembly 1, particularly when carrying a material laden bin. Such brake means are generally commercially available as part of the trailer hitch assembly and may be operated conveniently from the truck or other vehicle used to pull the carrier assembly. Such brake means, not shown in the drawings since it is a standard commercial item not forming an essential element of the invention, may be either hydraulically activated or electrically or air operated in its usual commercial forms.

In the operation of the portable carrier bin assembly of the present invention, carrier assembly 1 is backed up to bin 2 supported, e.g., at its lower elevation by telescoping support legs 17 in their closed position. The bin will frequently be in such a lower position at a first loading location at a central storage and loading area. Such a lower elevation is particularly convenient for loading bin 2 with the material to be transported. With the bin enclosed within the U-shaped carrier frame 3, hydraulic pump 10 may be activated by motor 11 to cause lifting arms 7 to rise from a lowermost position so as to engage lifting lugs 13 on bin 2. As lifting arms 7 continue to rise, therefore, bin 2 is lifted so that its support legs 17 are raised off the ground with proper clearance for over-the-road haul. While the loaded bin may at this point be lifted to its desired final elevation, if higher than its said lower elevation at the first loading location, it is generally desirable to simply raise lifting arms 7 sufficiently to provide proper ground clearance, with the bin being thereafter lifted to its desired higher elevation at the second discharge location upon arrival at said second location. Upon raising lifting arms 7 to a proper elevation by means of hydraulic cylinders 9, therefore, arm support members 20 are positioned under said arms 7 to support the arms and the bin carried thereby during transport from said first location to said second location. Upon arrival of the assembly at the second discharge location, e.g. at a job site, hydraulically operated cylinders 9 may be activated to further raise lifting arms 7 so that bin 2 is raised to its desired job-site elevation. With the bin at its desired higher elevation, telescoping legs 17 may be positioned in their extended position and secured by lock pin 18 so as to independently support bin 2 at said higher elevation. This higher elevation at the job site will generally be a convenient elevation from which material can be discharged from bin 2 through discharge gate 16 for batching, weighing or other job site purposes appropriate for the given application. Upon having independently supported bin 2 at its desired higher elevation at said second location, lifting arms 7 may be lowered as by bleeding hydraulic cylinders 9 or other convenient means depending upon the particular piston-cylinder system employed. Upon being lowered, lifting arms 7 disengage from the lifting lugs on bin 2, and the carrier assembly may be moved away from the re-located bin.

When it is desired to transport the bin from said discharge location to its initial loading location, the carrier is again backed up so that the bin assembly is enclosed within the U-shaped carrier frame. Lifting arms 7 are again raised by hydraulically operated cylinders 9 to engage the lifting lugs on elevated bin 2. With the bin supported by said lifting arms 7, telescoping support legs 17 are moved to their closed position, and the bin is lowered by lowering lifting arms 7, as to a convenient lower elevation with sufficient clearance for over-the-road haul. At the initial or loading location, lifting arms 7 are further lowered so as to lower the bin to the point at which support legs 17 touch ground and independently support bin 2 at its desired lower elevation with support legs 17 in their initial closed position. Lifting arms 17 are further lowered so as to disengage from the lifting lugs of bin 2, and the carrier assembly may then be moved away from the re-located bin.

It will be appreciated that said first and second elevations will depend upon the particular application and the means for loading and utilizing the product or other material being transported in accordance with the invention. In some instances, it may be desired that said first location be at a higher elevation and said second location be at a lower elevation. In other instances, the bin to be re-located may be positioned at the same elevation at said first and second locations. It will also be appreciated that, in the practice of the invention, storage bins or other containers may conveniently be moved from an initial location to several other locations and set up at a variety of different elevations conveniently and quickly as herein provided.

Similarly, the various elements of the apparatus herein disclosed are subject to numerous variations and modifications without departing from the nature and scope of the invention as set forth in the appended claims. For example, it will be understood that the carrier frame, conveniently described as a U-shaped frame, may be of any other convenient configuration with any desired number and orientation of support members provided that said carrier frame has an open end 6 so that the assembly can be backed up or otherwise positioned with carrier frame 3 enclosing bin 2 and with said bin and frame properly oriented for engagement of lifting arms 7 with the lifting lugs of bin 2 upon raising of lifting arms 7 as herein provided. In place of the single acting, hydraulically operated cylinders 9 referred to above, which are bled in order to lower lifting arms 7, hydraulically operated, double acting piston and cylinder devices, also commercially available can be employed, as can suitable motor driven cam means adapted to cause the desired movement of lifting arms 7 between desired upper, lower and intermediate elevations. In place of the protruding pin lifting lugs 13 on bin 2 and the corresponding notches 12 on lifting arms 7, it will be appreciated that other suitable means may be employed to pin or otherwise secure lifting arms 7 to bin 2. The embodiment shown, is preferred, however, since arms 7 may be disengaged from the bin simply by being lowered and do not require an operator to remove a connecting pin or otherwise disengage the lifting arms from the bin. Battery operated electric motor means can likewise be employed in place of the gasoline motor means disclosed above.

While the bin-supporting elevations employed may vary widely as indicated above, application of the invention for transporting bins in a particular circumstance is conveniently accomplished by establishing fixed lower, intermediate and higher elevations appropriate for the given application. In the use of the present invention for transporting sand, cement, pre-mix material and similar bulk products from a central storage area to job site locations, it is convenient to position the storage bin at a lower elevation at the first loading location so that such materials may be charged to the bin through the top thereof. During transport of the loaded bin to a job site, it is convenient to lift the bin so as to provide about a foot of road clearance. At the job site, it has been found desirable to position the bin at a higher elevation for discharge into batching equipment and the like. In one application of the invention, the lifting arms engage the bin lifting lugs at an elevation of about 7 feet, 2½ inches at the first loading area, are raised to about 8 feet, 2½ inches for transport of the bin to the second location, and are thereafter raised to a height of about 11 feet, 11 inches at said second location. The telescoping legs are then extended so as to support the bin at the desired elevated location. While the bin is held at the intermediate elevation for transport, arm support members of the upper size are folded out to provide support for the lifting arms holding the bin at the indicated intermediate elevation.

While the invention has been described herein with particular reference to storage bins for bulk products, such as sand, cement, etc., to be used at a job site, it will be appreciated that the novel carrier assembly herein provided can be used to transport a variety of other forms of containers or articles. For example, the bins provided may comprise trash bins used to transport waste between a central pick-up location and a storage dump. The bin may, in fact, not constitute a storage bin at all, but may constitute some other form of article or container that is to be transported between locations, particularly where it is to be used at different elevations at different locations. The facility with which such movement or transport of bins, containers or other articles can be moved between desired locations by means of the portable carrier assembly of this invention constitutes a major advantage in the art. The time and effort reduction thereby achieved represents a significant saving in operating cost in the necessary transport of materials between loading and discharge points.

Therefore, we claim:

1. A portable carrier-bin assembly comprising:

a. an upright bin having an opening at its upper end for charging of material and a lowermost discharge opening in its bottom surface, said bin having projecting lifting members on opposite sides of the uppermost portion thereof and having support legs attached thereto, said legs being adapted for adjustment in length so as to permit support of said bin at different selected elevations;

b. a U-shaped carrier frame having a closed front end and sides and an open rear end, said U-shaped carrier frame being sized to permit enclosure of at least a lower portion of said bin in upright, leg supported position when the open end of said carrier is backed up to said bin in upright position;

c. wheels attached to said carrier frame for moving said carrier frame from one location to another;

d. lifting arms pivotally mounted on opposite sides of the closed end of said frame and extending toward the rear of the frame to an intermediate location along its length, said lifting arms being provided near their upper ends on their upfacing sides with open notches formed to receive said lifting members, the open notches of said lifting arms being adapted to engage said projecting lifting members on opposite sides of the bin upon being raised from below said legs and to disengage said projecting lifting members upon being lowered while said bin is independently supported at an elevated position above the ground, said lifting arms being adapted for movement between a lower, an intermediate, and upper positions, said lower position being such that upon being raised from below, the open notches of the arms will engage the projecting lifting members on the bin when the bin is independently supported at a first low elevation by its legs when adjusted for short length, said intermediate position being sufficient to support said bin with adequate ground clearance being provided for said support legs for movement from said first location to a second location, said upper positions being above said intermediate position and at least some of them being above the elevation of pivotal connection of said lifting arms to said carrier frame and such that said bin may be raised to an elevation above that of said intermediate position where it may be independently supported at a relatively high elevation at said second location by said adjustable legs when adjusted for long length, and said legs of the bin in at least one retracted position extending below the bottom of the bin whereby the bin may be lifted from ground contact with its legs retracted by moving the lifting arms up to the intermediate position during the movement of the assembly from one location to another and whereby the lifting arms may be moved from the intermediate position to the upper position so that the bin legs may be extended to ground contact to provide clearance under the bin for equipment to receive material discharged from the bin;

e. means mounted on said carrier frame for raising and lowering said pivotally mounted lifting arms between said lower, intermediate and upper positions;

f. arm support members secured to the opposite sides of said carrier frame adapted to support said lifting arms approximately in said intermediate position during movement of said assembly from one location to another, said arm support members being arranged to permit folding aside when not employed for supporting said lifting arms, whereby said arm support members do not interfere with the lowering of said lifting arms to said lower position;

g. mechanical means at the closed end of said U-shaped frame for coupling said assembly to a source of locomotion for transporting said assembly from one location to another, whereby with said lifting arms in a position below the level of the projecting lifting members on said independently supported bin, said carrier may be backed up to the bin to be moved, the lifting arms may be raised to engage the projecting lifting members on said bin, the legs on said bin may be adjusted to the extent necessary to a length suitable for transportation and said lifting arms may be adjusted to said intermediate position for transportation of said bin enclosed within said U-shaped frame, and thereafter at a new location the lifting arms may be adjusted to position the bin at its desired new support level and the legs of said bin may be adjusted for independent support of the bin at the desired support level, and the lifting arms may then be lowered, thereby disengaging from the projecting lifting members on said bin so that the carrier may then be moved away from the relocated bin.

2. The apparatus of claim 1 in which said means for raising and lowering said pivotally mounted lifting arms comprises hydraulically operated piston and cylinder devices pivotally connected to said frame and to said lifting arms.

3. The apparatus of claim 1 in which said means for raising and lowering said pivotally mounted lifting arms comprises, hydraulically operated piston and cylinder devices pivotally connected to said carrier frame and to said lifting arms and including a motor driven pump mounted on said carrier frame adapted to furnish the hydraulic pressure needed to operate said piston and cylinder devices and a motor mounted on said frame to power said pump.

4. The apparatus of claim 1 in which said projecting lifting members on said bin are lifting lugs positioned on opposite sides of the bin and said upfacing sides with notches on the lifting arms are adapted to receive said lifting lugs, and said legs on said bin are telescoping legs adapted to be extended or contracted to selected lengths and secured at such selected lengths so as to independently support said bin at selected elevations.

5. The apparatus of claim 1 in which said legs on said bin are telescoping legs adapted to be extended or contracted to selected lengths and secured at such selected lengths so as to independently support said bin at selected elevations.

* * * * *

UNITED STATES PATENT OFFICE
CERTIFICATE OF CORRECTION

Patent No. 3,834,568           Dated September 10, 1974

Inventor(s) Clarence E. Larson; Richard Dawley; Roger Reese

It is certified that error appears in the above-identified patent and that said Letters Patent are hereby corrected as shown below:

Column 5, line 63, "upper" should be -- proper --.

Signed and sealed this 24th day of December 1974.

(SEAL)
Attest:

McCOY M. GIBSON JR.
Attesting Officer

C. MARSHALL DANN
Commissioner of Patents